April 17, 1934.　　　P. L. YOUNG　　　1,954,972
HYDROGENATION OF OILS
Filed July 22, 1929
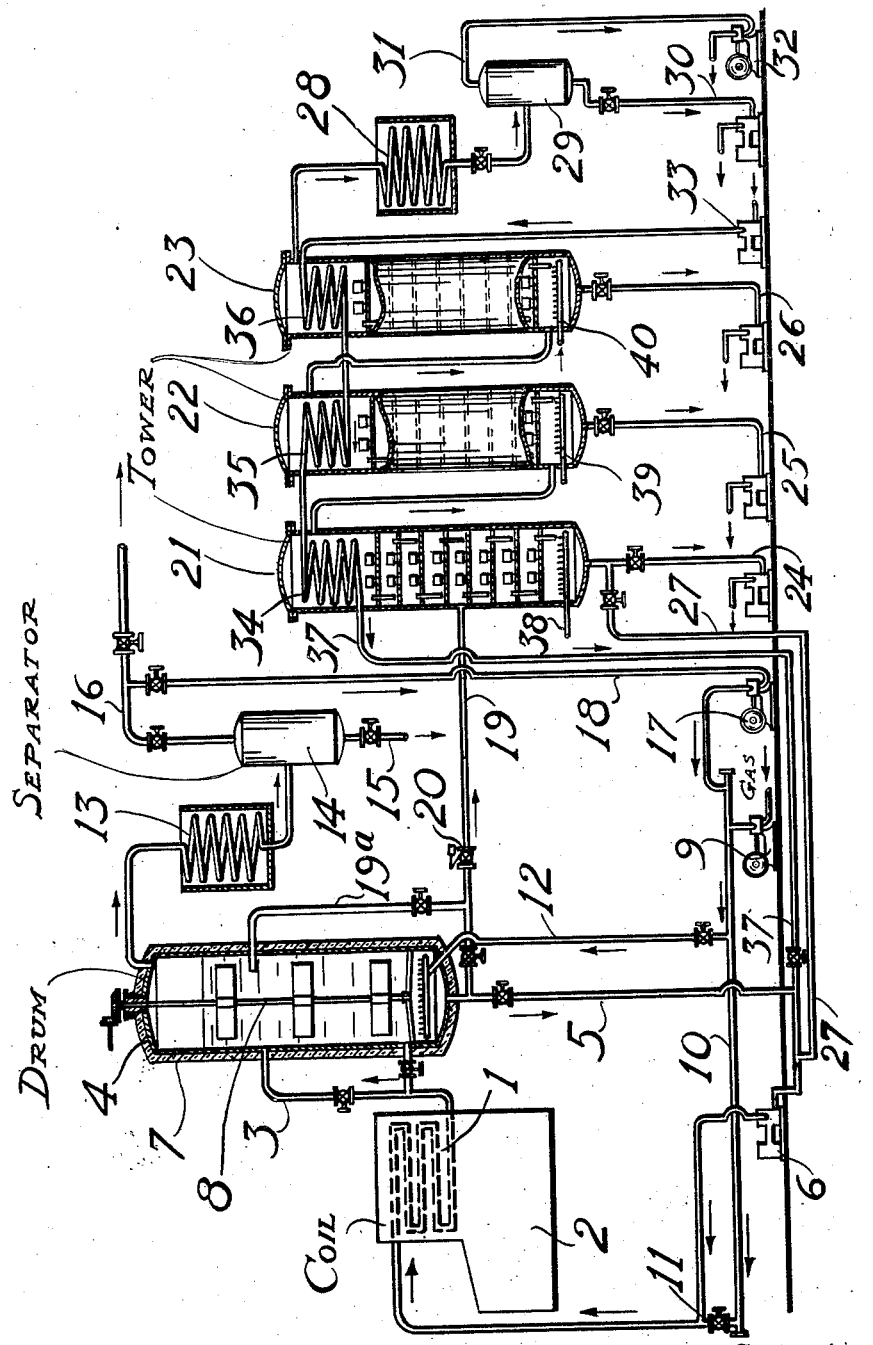
Inventor
Philip L. Young
By his Attorney Patented Apr. 17, 1934

1,954,972

UNITED STATES PATENT OFFICE 1,954,972

HYDROGENATION OF OILS

Philip L. Young, New York, N. Y., assignor to Standard-I. G. Company

Application July 22, 1929, Serial No. 379,914

6 Claims. (Cl. 196—78)

The present invention relates to the art of obtaining valuable products from crude petroleum and more specifically comprises an improved process for producing high grade lubricating oils from hydrocarbons which have heretofore been considered unsuitable for such purpose. My invention will be fully understood from the following description and the drawing which illustrates one form of apparatus suitable for carrying out the process.

The drawing is a semi-diagrammatic view in sectional elevation of an apparatus constructed according to my invention and indicates the flow of materials.

Referring to the drawing, reference character 1 denotes a coil arranged in a furnace setting 2 which is adapted to heat an oil pumped therethrough to an elevated temperature. The coil discharges through pipe 3 into a drum 4 which is adapted to withstand high temperature, pressure in excess of 200 atmospheres or more and the corrosive effects of the reactants. The drum is maintained at a high temperature by any suitable means but preferably by withdrawal of a part of the oil by line 5 and circulation of the same through coil 1 and back to the drum by pump 6. The drum is preferably protected from excessive loss of heat by insulation 7 and the contents may be kept in agitation by a stirrer 8 or otherwise.

Hydrogen or a gas rich in free hydrogen is forced into the system by compressor 9 to manifold 10 which feeds the coil by a branch line 11 and the drum by a branch line 12. Gas and light oil distill from the drum, flowing to condenser 13 and separator drum 14 from which the oil is withdrawn by line 15 and gas by line 16. Part of the gas may be boosted to full pressure by a compressor 17 and returned to manifold 10 by line 18. The gas is preferably purified before recirculation in a system (not shown) which may comprise washing the gas with aqueous soda for removal of hydrogen sulfide and oil to remove hydrocarbon gas, or any other suitable system.

A part of the oil from drum 4 is withdrawn by branch line 19 which is fitted with a pressure reduction valve 20. The oil may be withdrawn from the bottom of the drum by a connection between pipes 5 and 19 or from the upper part of the drum by line 19a. After reduction of pressure the oil is discharged into a suitable separation equipment which comprises a series of partial condensers, preferably in the form of rectifying towers 21, 22, and 23, respectively. The towers may be fitted with baffles or preferably bell cap plates, as shown, and condensate is withdrawn from each tower by lines 24, 25, and 26, respectively. The heavy residue from tower 21 may be returned to line 5 by a return line 27 and pump 27a and thence to coil 1 and drum 4, as above described. Uncondensed vapor from the last tower 23 is conducted to a condenser 28 and drum 29 from which distillate is removed by line 30 and fixed gas by line 31 by a vacuum pump 32 which is used when the separation equipment is maintained at a sub-atmospheric pressure.

The fresh oil fed to the system is forced by pump 33 through condenser coils 34, 35, and 36, which may be fitted in the upper portions of towers 21, 22 and 23 respectively, and the preheated oil is conducted to line 5 by line 37. Live steam or gas may be introduced into the lower parts of towers 21, 22 and 23 by pipes 38, 39, and 40, as will be understood.

In the operation of my process, crude oils, reduced crudes, heavy residues, and the like, which may contain gummy, semi-solid, unsaturated components, sometimes of an asphaltic or resinous nature with or without oxygen-containing bodies, may be utilized for the production of high grade lubricating distillates. Such material is subjected to the action of a gas rich in free hydrogen under high pressure and at an elevated temperature. Pressure is in considerable excess of atmospheric and preferably in the neighborhood of 200 atmospheres or more. The temperature of the drum is maintained within the range of about 700 to 850° F. and preferably below such temperature at which production of low boiling oil is rapid. Formation of low boiling oil is preferably limited to not more than about 5 to 10% of light oil boiling below about 400° F. on the feed charged, although it may reach 15 or 20% in some cases. This is most conveniently accomplished by increasing the rate of flow until the time is insufficient for a more complete conversion to light oils.

Catalysts may be used to promote hydrogenation, and catalysts such as chromium and molybdenum oxides, mixtures of the same with each other and with other oxides of salts or other metals, preferably of the 6th and 8th groups of the periodic system, may be advantageously used in the form of finely ground powders suspended in the oil or may be in lump form supported, if desired, on kaolin or other suitable material and packed into drum 4. All of these catalysts are sulfactive, that is, are not poisoned by or in the presence of sulfur or sulfur-containing compounds. Metallic catalysts may be used. If packed catalyst is used, the stirrer 8 will be omitted.

Under the conditions specified, fixed gas with light oils distill from the drum 4 under full pressure and after condensation and removal of liquid oil the gas is returned to the body of oil undergoing treatment but before the return, it is preferably to purify the gas of hydrogen sulphide and the major part of its hydrocarbon constituents. This may be done by scrubbing with oil and soda solution, if desired.

Part of the oil within the drum is withdrawn by lines 19 or 19a and discharged with a substantial reduction of pressure into the separation equipment. The greater part of the oil is vaporized by the reduction of pressure, leaving a pitch bottoms containing the non-volatile suspended catalyst, if used. The bottoms carrying catalyst with it, as will be understood, may be returned to the drum for further reaction.

The vaporized oil is then partially condensed, preferably under rectification conditions to form such other cuts which may be used as lubricants or which may serve as cracking stocks. If desired, a part of the oil so vaporized may be returned for retreatment in drum 4.

When it is desired to obtain the best yield of lubricating oils, wax distillate and the like, formation of light oil is preferably limited to less than 5 to 10% and the heavy oils are distilled under high vacuum after withdrawal from the drum, and it is possible to produce by the present method a lubricating oil from coastal or mixed base crude which is equal or superior to the best grades of Pennsylvania lubricants, in all respects.

The quantity of hydrogen circulated is greatly in excess of that required for the reaction, and it is desirable to circulate about 5,000 cu. ft. per barrel of fresh oil although more or less may be used.

My invention is not to be limited to any theory of the mechanism of the process nor by any illustrative example which may have been given, but only by the following claims in which I wish to claim all novelty inherent in the process.

I claim:

1. An improved process for obtaining high grade lubricating oil distillates from heavy petroleum hydrocarbons comprising maintaining a body of such oil at a temperature between 700 and 850° F. and under a pressure of about 200 atmospheres for a time insufficient to convert more than about 10% into light oil, forcing a gas rich in free hydrogen into the oil removing vapors from the body of oil, separately withdrawing a portion of the oil, reducing pressure on the oil withdrawn whereby a substantial part of the same is vaporized, condensing a part of such vapor to form a high grade lubricating distillate and returning the unvaporized oil to the hydrogenation.

2. Process according to claim 1 in which oil is forced continuously into the body and a mixture of oil and finely divided sulfactive catalyst suspended therein is continuously withdrawn therefrom and in which the oil withdrawn is distilled on reduction of pressure to leave a fluid residuum containing suspended catalyst which is returned to the body of oil undergoing treatment.

3. Process according to claim 1 in which the vapor formed on reduction of pressure is partially condensed into a plurality of cuts, one of which is a high grade lubricating oil.

4. Process according to claim 1 in which the vapor formed on reduction of pressure is partially condensed into a plurality of cuts under rectification conditions.

5. An improved process for obtaining valuable lubricating oil distillates from heavy petroleum fractions, which comprises subjecting a body of such oil to the action of hydrogen under pressure of about 200 atmospheres and at a temperature between 700 and 850° F. restricting the formation of low boiling hydrocarbons to not more than about 10% of the original oil, taking off vapors of such low boiling hydrocarbons, separately withdrawing unvaporized oil comprising the major portion of the desired higher boiling fractions, reducing pressure on the hot unvaporized oil withdrawn sufficiently to cause said fractions to vaporize, and separately collecting condensate formed from such vaporized fractions.

6. Process according to claim 5 in which pressure on the portion of oil withdrawn is reduced to below atmospheric pressure.

PHILIP L. YOUNG.